May 19, 1942.  W. M. HARCUM  2,283,753
ANTIHUNTING AUTOMATIC PILOT
Filed June 9, 1939
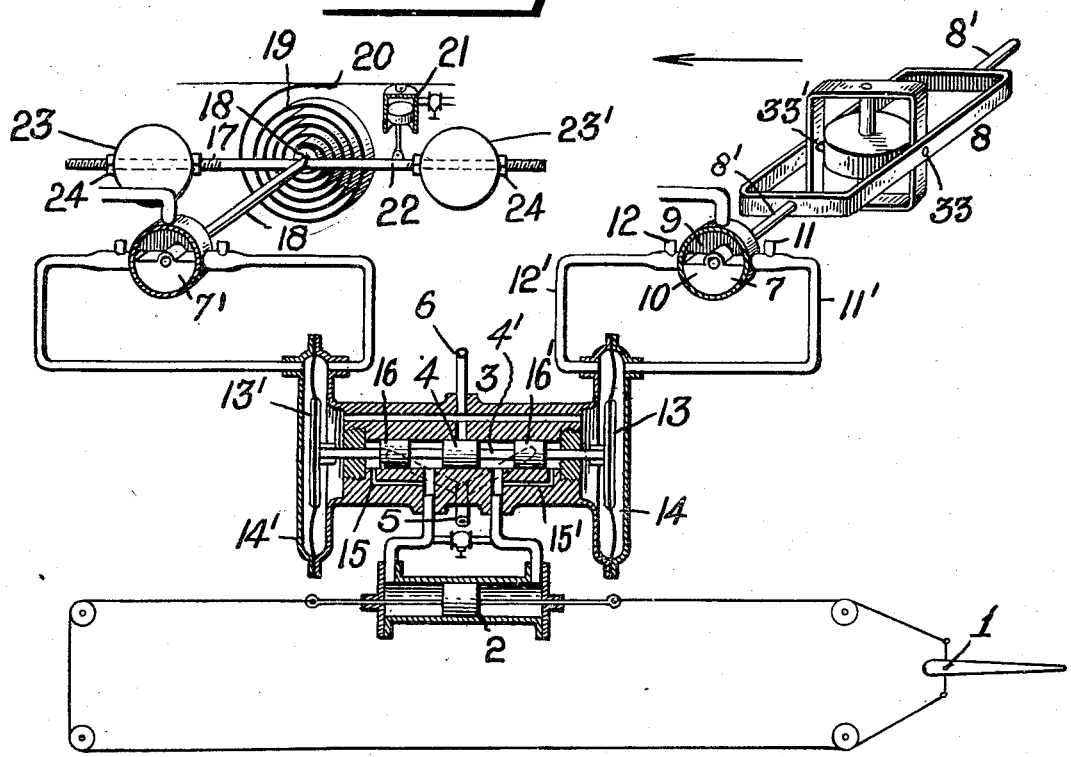
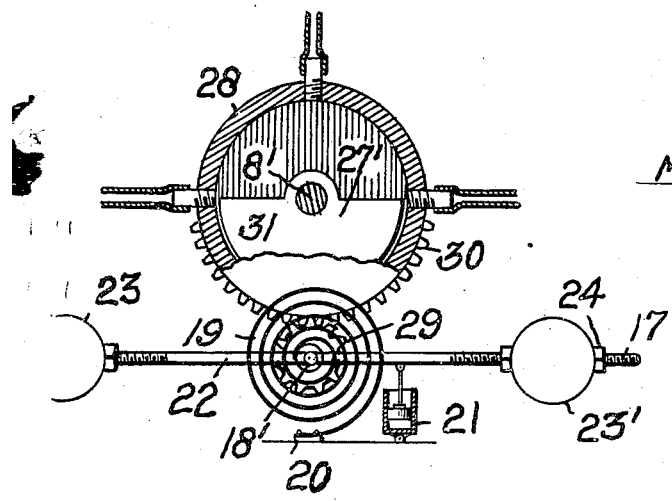
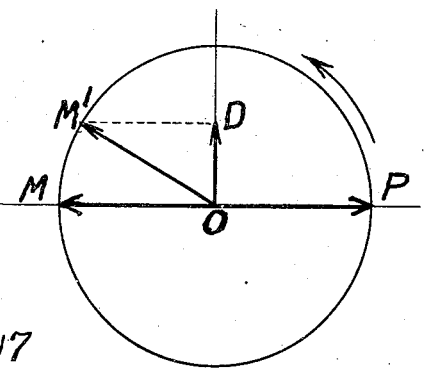
INVENTOR
WILLIAM M. HARCUM
BY
Herbert H. Thompson
HIS ATTORNEY.

Patented May 19, 1942

2,283,753

UNITED STATES PATENT OFFICE 2,283,753

ANTIHUNTING AUTOMATIC PILOT

William M. Harcum, East Orange, N. J., assignor to Sperry Gyroscope Company, Inc., Brooklyn, N. Y., a corporation of New York Application June 9, 1939, Serial No. 278,254

5 Claims. (Cl. 244—76)

This invention relates to automatic pilots for dirigible vehicles, such as airplanes or ships, and has special application to the former. At present it is the practice in airplane automatic pilots to control the airplane from a signal actuated primarily from a position maintaining means, the signal being proportional, therefore, within limits, to the displacement of the object from the position determined by the position maintaining means. Such a device is usually subject to hunting or oscillation about a mean position, since the signal and the response thereto always lag behind the departure of the craft, and the craft, therefore, in being brought back to its original position, usually swings beyond the same before a counter signal is applied.

The present invention relates to a novel and simple means for damping and suppressing such oscillations without the employment of an additional rate gyroscope. An ideal damping force preferably leads by approximately 90° the primary oscillatory motion, and any force having such a 90° component will act as a damper. A very simple method of securing such a force is by means of a simple inertia device somewhat similar to a torsion pendulum, mounted for oscillation about the axis of stabilization, said device comprising a pivotally mounted balanced mass normally spring centralized in one position and the oscillations of which are preferably damped. The signal from said device is preferably combined in some manner with the signal from the position maintaining device to control the servomotor which positions the rudder or other control surface.

Referring to the drawing, showing one form my invention may assume,

Fig. 1 shows a diagrammatic view, partly in perspective and partly in section, of an automatic control system for the control surface of an airplane, such as the elevator.

Fig. 2 is a vector diagram illustrating the phase relationships between the primary and damping forces.

Fig. 3 is a sectional view showing a modified form of the invention in which the inertia device or dynamic vibration absorber acts as a follow-back connection to the pick-off at the gyroscope.

Referring first to Fig. 2, OP represents the amplified displacement signal force originating at the gyro pick-off, amplified through the servomotor and applied to the airplane through the rudder or other control surface. OM represents the momentum or inertia force of the airplane opposing the signal force, and which therefore is represented as displaced 180° therefrom. Such a system is obviously oscillatory. OM' represents the amplified force created by pickoff 7' on the inertia device or dynamic vibration absorber. Insofar as this force is in phase with OM, that is, 180° out of phase with the displacement signal force OP, it in effect transfers the oscillatory movements of the plane into oscillations of the inertia device, assuming the natural period of oscillation of the inertia device to be the same as that of the plane, and the plane itself almost stands still, i. e., does not oscillate about the axis in question. Preferably, however, as in any control system capable of oscillation, damping is also provided, and for this purpose the signal from this device is caused to lag behind OM, as by means of a damper, and therefore leads OP. In other words, its time phase lags behind the vector of the true inertia OM. Due to such lag, OM' has a component OD perpendicular to OP and therefore acts to damp the oscillations of the craft, as distinguished from merely opposing such oscillation as in the undamped arrangement. By proper adjustments of the natural period of the inertia device and of the strength of the damper thereon, the device may be adjusted to be critically or over damped and thereby to cause dead beat operation of the airplane, that is, to entirely suppress hunting.

In Fig. 1, I represents any of the control surfaces of the craft, which are employed to control the same about any one of the three principal axes, that is, the rudder for steering in azimuth, the elevator for trim or pitch control and the ailerons for lateral stability. Said control surface is shown as positioned from a servomotor or piston 2, preferably of the hydraulic type, which in turn is controlled from a relay valve 3 (drawn to a much larger scale in proportion than the servo cylinder 2). The relay valve is shown as comprising a multiple piston slide valve 4 which controls the passage of pressure oil admitted through pipe 5 to one or the other end of the cylinder 2, return flow being back through the valve and out through exhaust pipe 6. The position of the valve is shown as controlled by differential air pressure from a differential air pick-off 7 on one axis of the position maintaining means 8, which in this instance is shown as a gyro-vertical mounted on principal trunnions 8'—8' and minor trunnions 33—33'. If the airplane is headed in the direction of the arrow, pick-off 7 on trunnion 8 will detect pitch of the craft to control the elevator 1 to keep the craft on an even keel.

The air pick-off may be of the vacuum type, air being continuously exhausted from the chamber 9 surrounding the semi-circular cut-off valve 10. Bleed holes 11 and 12 are provided in the pipe connections 11' and 12' connecting opposed ports in the chamber 9 to opposite sides of the diaphragm or piston 13 in the chamber 14, the piston 13 being mounted on the piston rod 4' of the relay valve 3. The movement of the piston 13 is, however, yieldingly opposed in some manner so that its position depends primarily on the position of the valve 10 with respect to the opposed ports in chamber 9. In the particular form of relay valve shown, the opposing action is obtained from the differential oil pressure supplied at the opposite ends of the cylinder 2 by means of bypass passages 15 and 15', which lead the oil pressure in behind the outer pistons 16 and 16' on the piston valve 3 to oppose the air pressure on the piston 13. Such a valve is known in the art and is described in the prior application of Theodore W. Kenyon and Stephen J. Zand, now Patent No. 2,210,917, for Reactive servo system for automatic pilots, dated August 13, 1940.

As above stated, the system so far described is likely to hunt. To suppress this undesirable action, I have shown an inertia or torsion pendulum device 17 secured to shaft 18 which is journaled on an axis parallel to the axis 8—8' of stabilization of the gyroscope, which is, in the embodiment shown, parallel to the pitch axis of the airplane. Said means is normally balanced about said axis and is yieldingly centralized as by a coil spring 19 secured at its outer end 20 to datum and at its inner end to the pivoted mass of said pendulum. Preferably said mass is also damped as by means of the dashpot 21. The natural period of oscillation of said mass is adjusted so that it will lag behind the oscillation of the aircraft by slightly more than 180° during the periodic oscillations of the craft. However, during a slow departure of the craft, little or no signal is received from the device, since the bearing friction of the shaft 18 and the tension of spring 19 will cause the mass to keep up with the airplane. The faster the departure of the craft, the greater will be the signal from device 17. The period of oscillation of pendulum 17 may be adjusted by making its mass in the form of a central threaded rod 22 on which is adjustably threaded at each end masses 23 and 23'. The lever arm of these masses may be carefully adjusted by turning the same on the rod and then locking in place by lock nuts 24. The shaft 18 which supports the torsion pendulum for oscillation is shown as provided with a pick-off 7', which may be similar in all respects to the pick-off 7 of the gyroscope, and the differential air pressure supplied therefrom may be also applied to the valve stem 4' through piston 13' and the enclosing chamber 14'.

An analysis will show that upon proper adjustment of the device, the signal from pick-off 7' has a component which will be superimposed on the other signal so as to be additive to the signal from 7 during excursions of the aircraft away from its normal position, while said signals will be opposed to each other during the return movement of the craft. This results in rapid damping of oscillations and, therefore, in smooth flight without hunting.

Instead of bringing the inertia device into the servomotor system through a second air pick-off 7' thereon, I may secure a similar result, i. e., may superimpose the signals in a different manner, by connecting said device directly to the primary pick-off 27 on the trunnion 8' of the gyro vertical 8 of the automatic pilot (Fig. 3). In this case, I connect the shaft 18' of the inertia device to the housing 28 of the pick-off device through pinion 29 on shaft 18' which meshes with teeth 30 on said housing so that said housing is displaced with respect to the pick-off disc 31 when the inertia device lags behind the movement of the craft. This has substantially the same effect as the form of invention shown in Fig. 1 in damping oscillations of the craft, since it increases the signal on excursions of the craft away from its normal position and decreases the signal on the return excursions.

The operation of my invention may also be viewed as a modified form of dynamic vibration absorber in which the vibration absorber itself is too small to exert any appreciable damping or oscillation transferring forces on the system, but in which the signal from said absorber is amplified and applied in such manner as to suppress the vibrations. In this manner the principle of the dynamic vibration absorber may be applied to aircraft without materially adding to the weight thereof.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In an aircraft equipped with an automatic pilot, the combination with the said automatic pilot, of a dynamic oscillatory vibration absorber of the spring centralized inertia type mounted on said craft and having a natural period substantially the same as the natural period of the craft, and pick-off means thereon operating through said automatic pilot to oppose the hunting of the craft.

2. In an aircraft equipped with an automatic pilot, the combination with the said automatic pilot, of a dynamic oscillatory vibration absorber mounted on said craft, said absorber having a natural period substantially the same as the natural period of the airplane hunt, a damper for said absorber to adjust the phase of oscillation thereof relative to that of the hunting of the craft, and pick-off means thereon operating through said automatic pilot to oppose the hunting of the craft.

3. In a damping device for aircraft equipped with an automatic pilot for stabilizing the craft about an axis, said pilot including a position-maintaining device for maintaining a stable plane in space and also including a servo-motor controlled from said device for operating the control surface of said craft controlling movement of said craft about said axis, the combination including a spring centralized balaced inertia device, means for mounting said device for oscillation about an axis parallel to said axis of stabilization, and means actuated from said inertia device for displacing the time phase of the control between said position-maintaining device and said servo-motor, whereby damping is secured.

4. In a damping device for aircraft equipped with an automatic pilot for stabilizing the craft about an axis, said pilot including a position-maintaining device on said craft for maintaining a stable plane containing said axis and also including a servo-motor controlled from said device for operating the control surface of said craft controlling movement of said craft about said axis, the combination including a spring centralized balanced inertia device, means for mounting said inertia device about an axis parallel to the axis of stabilization, a damper for said inertia device, and means actuated from said inertia device for displacing the time phase of the control between said position-maintaining device and said servo-motor, whereby damping is secured.

5. In an automatic pilot for aircraft having a control surface, a position-maintaining means comprising a gyroscope, means including a servo-motor for controlling the control surface of said craft, means including a pick-off at said position-maintaining means responsive to relative turning of said craft and position-maintaining means about a axis for controlling said servo-motor, a spring centralized balanced inertia device, means for mounting said inertia device for oscillation about said axis, further means including a pick-off at said inertia device for also controlling said servo-motor, and means for combining the controlling effects of said two controlling means on said motor to damp oscillations of said craft.

WILLIAM M. HARCUM.